INVENTOR.
Arthur J. Woolcott
BY Mawhinney & Mawhinney
ATTORNEYS.

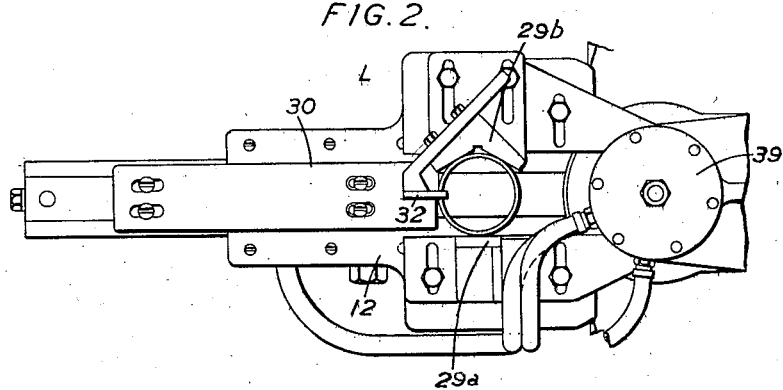
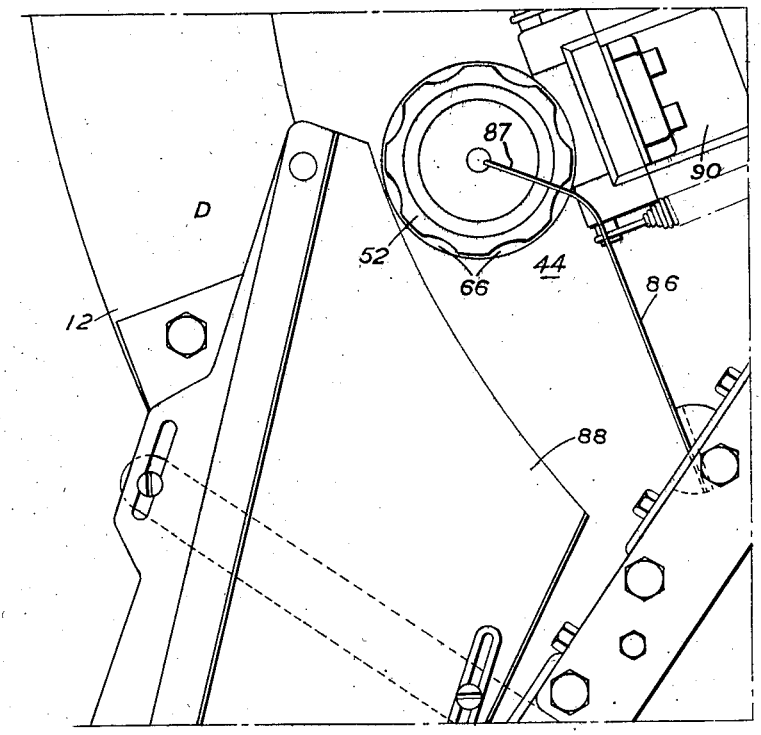

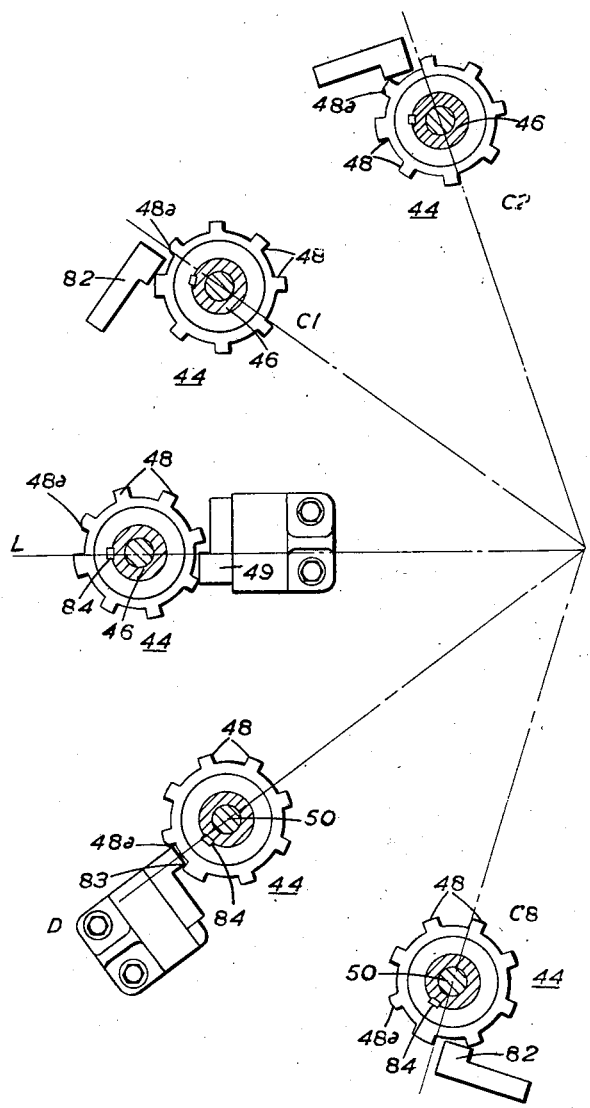

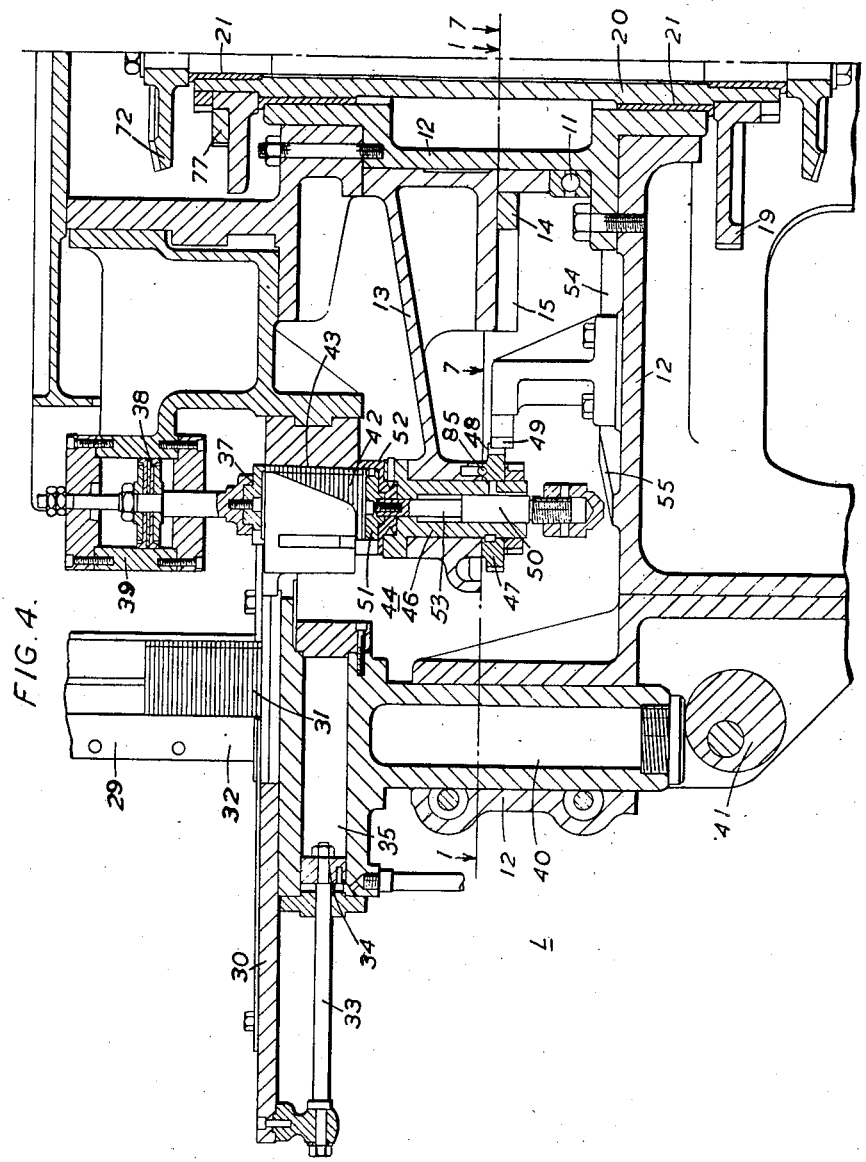

March 18, 1952   A. J. WOOLCOTT   2,589,590
MANUFACTURE OF SLOTTED OIL CONTROL AND LIKE RINGS
Filed July 2, 1947   6 Sheets-Sheet 5

INVENTOR.
Arthur J. Woolcott
BY Mawhinney & Mawhinney
ATTORNEYS.

March 18, 1952 A. J. WOOLCOTT 2,589,590
MANUFACTURE OF SLOTTED OIL CONTROL AND LIKE RINGS
Filed July 2, 1947 6 Sheets-Sheet 6
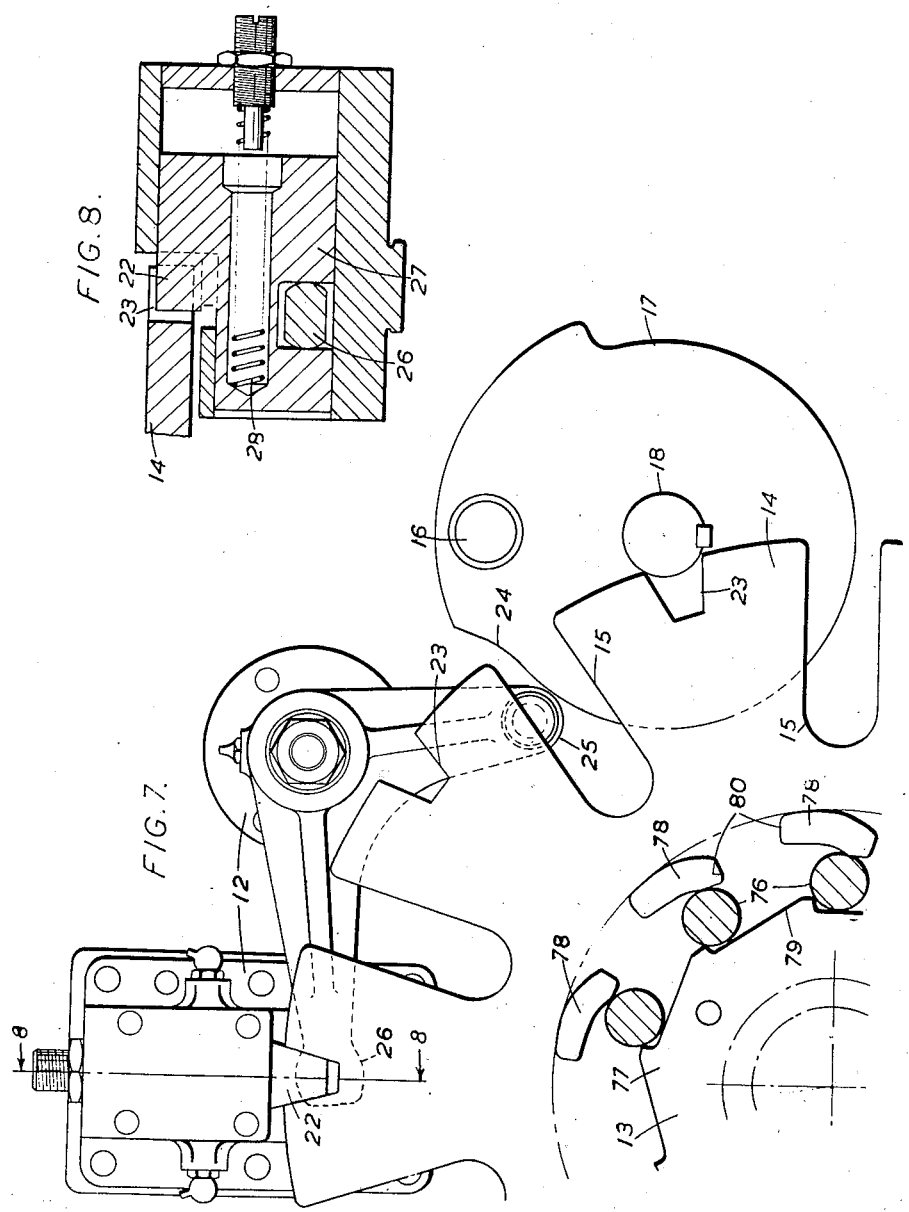
INVENTOR.
Arthur J. Woolcott
BY Mawhinney & Mawhinney
ATTORNEYS.

UNITED STATES PATENT OFFICE 2,589,590

MANUFACTURE OF SLOTTED OIL CONTROL AND LIKE RINGS

Arthur J. Woolcott, Lymington, England, assignor of one-half to Wellworthy Piston Rings Limited, Lymington, England Application July 2, 1947, Serial No. 758,559
In Great Britain March 11, 1947

1 Claim. (Cl. 90—15.1)

This invention relates to an improved continuously-operated machine for forming X angularly-spaced part-circumferential slots in a ring, where X is any desired and convenient number.

In particular, oil control rings are used in internal-combustion engines having a number of through peripheral slots which are co-planar and spaced angularly from one another, usually from about five to twelve slots, depending upon the diameter of the ring—but there is a tendency nowadays to limit the number of slots to eight or ten, eight slots for the smaller-diameter rings and ten slots for the larger-diameter rings. The rings may be peripherally grooved in the plane of the slots.

In other cases axially-compressible rings, for use in internal-combustion engines in which wear has occurred in the cylinder bores, are formed with overlapping, angularly-spaced, thin slots in, for example, two different planes.

The main object of the invention is to provide a continuously-operated machine which will speed up the formation of the slots of a ring.

The invention consists of a continuously-operated machine, for providing X angularly-spaced slots in a ring, which may be hand or hopper fed and which has X rotatable circular cutters spaced from one another, and automatic means for bringing a ring successively to each cutter in a predetermined angular position relatively to the cutter so that each cutter will form one of the desired slots.

If desired, there may be gangs of coaxial circular cutters for simultaneously slotting a group of coaxial rings.

In carrying out the invention, there are preferably at least X+2 "stations" (i. e., places at which different operations are effected) arranged in a circle, two or more adjacent "stations" being for loading and discharge and the remaining X "stations" being the cutting "stations." A receiver for the ring may be carried from one "station" to another by a member (hereinafter referred to as the rotor), rotatable with a step-by-step motion, so that the receiver will pause at each "station."

Each cutting "station" may have a plunger movable to clamp the ring in the receiver during the cutting operation.

Preferably the receiver has in it a spring-pressed cam-operated plunger by which the ring is positioned, axially of the receiver, for cutting as the receiver leaves the loading "station." The delivery "station" may have a spring which is loaded by the approach thereto of the receiver and which removes the completed ring when the cam-operated plunger aforesaid ejects it from the receiver.

Preferably each cutter is reciprocated to engage the ring at the adjacent cutting "station" by a slide having a projection engaged between an internal ring cam and a ring of outer, spaced, cam abutments between adjacent pairs of which the projection can be advanced at the appropriate times.

Furthermore, the plungers are preferably pneumatically operated.

The accompanying drawings show one machine, according to the invention, for forming eight slots in a ring, the rings in this machine being shown as being hopper fed. Of these drawings:

Figure 2 is a fragmentary plan of the loading "station," as described in my Patent No. 2,509,622, granted May 30, 1950, filed at the same time as this application;

Figure 3 is a fragmentary plan showing the indexing means for the receivers;

Figure 4 is a sectional elevation of half the machine, taken mainly on the line 4—4 of Figure 1;

Figure 6 is a fragmentary plan, to a larger scale than that of Figure 1, of the discharge "station," with the pressure pipes removed;

Figure 5:
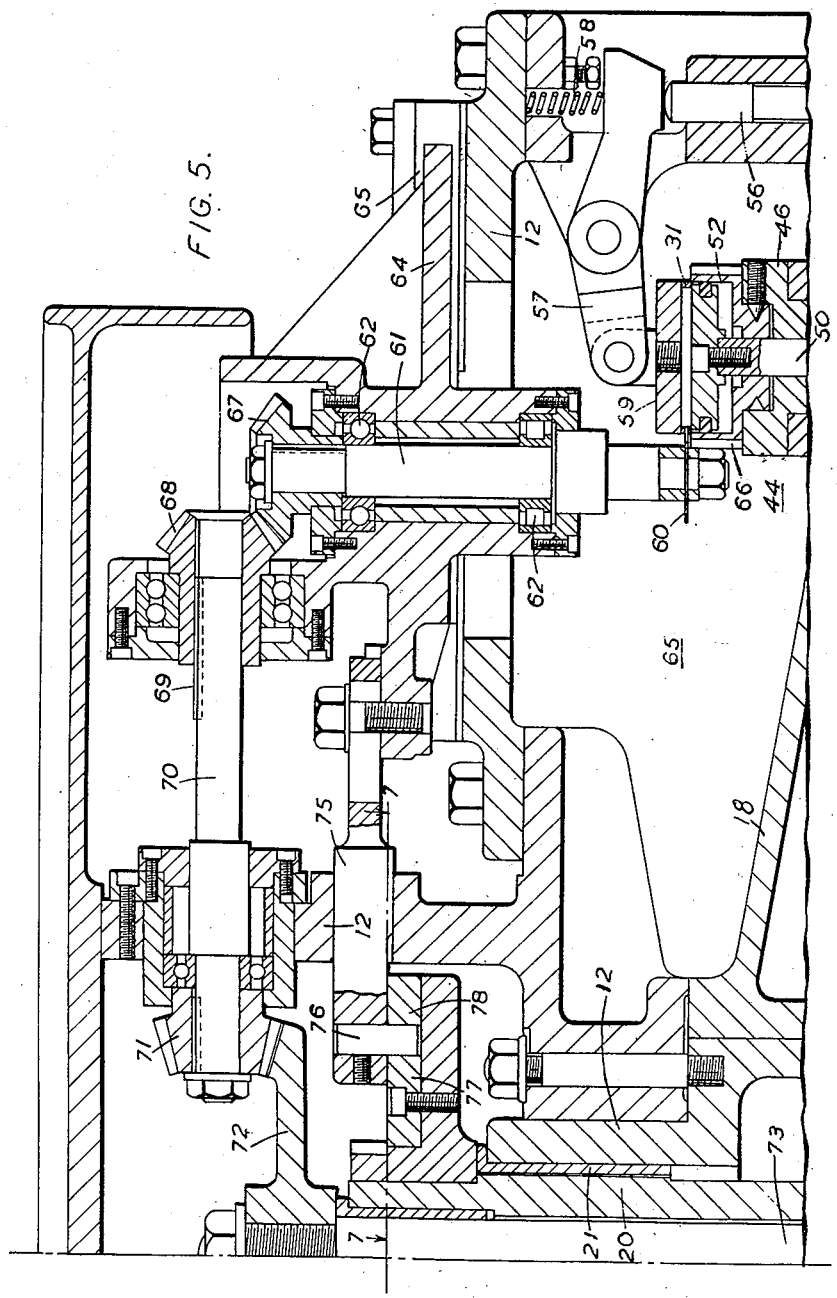
Figure 5 is a sectional elevation, to twice the scale, of the other half of the machine, showing a typical cutting "station," the section being taken on a continuation of the line 4—4 of Figure 1.

Figure 7 is a fragmentary sectional plan, to the larger scale, taken partly on the line 7—7 of Figure 4 and partly on the line 7—7 of Figure 5; and Figure 8 is a sectional elevation of the locking bolt, taken on the line 8—8 of Figure 7.

In the drawings the loading "station" is marked L, the cutting "stations" C, i. e., C1, C2–C8, and the discharge "station" D, there being ten "stations" altogether for the cutting of eight slots in a piston ring. The stationary portions of the machine are designated by the reference character 12, and portions of the rotor are designated by the reference character 13. A thrust bearing 11 (Figure 4) supports the rotor. The rotor 13, which is rotatable with a step-by-step motion, has fast with it a disc 14 (Figures 1, 4 and 7) with one slot 15 for each "station," i. e., ten slots in the present instance, and is driven by a pin 16 (Figure 7) on a disc 17, fast with a rotatable shaft 18, in the manner of an ordinary Geneva-stop mechanism. The shaft 18 is continuously rotated, for example, by an electric motor and step-down gearing, and it also has a driving connection with the gear wheel 19 (Figure 4) fast on a tubular shaft 20, the latter being journalled in the stationary portion 12 by plain bearings 21.

Figure 1:
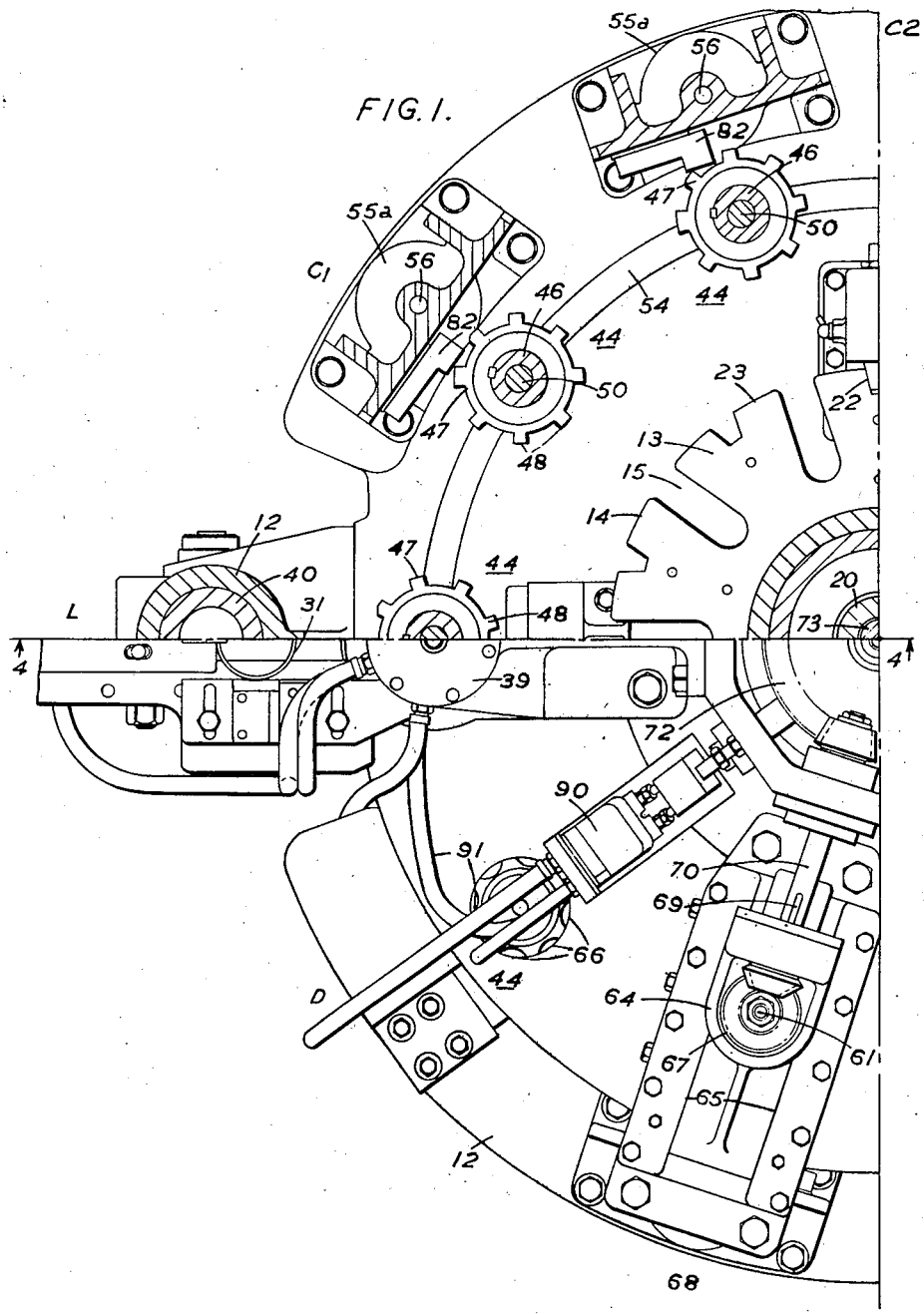
Figure 1 is a part-sectional plan of half the machine, the sectional portion (i. e., the top half) being taken mainly on the line 1—1 of Figure 4.

Whilst the disc 14 is not being notched-on it is held stationary by a locking bolt 22 engaged with one of the coacting peripheral notches 23 (Figures 1, 7 and 8). When the disc is to be notched on, i. e., as the pin 16 is entering one of the slots 15, the rising cam 24 of the disc 17 engages the adjacent end 25 of a bell crank lever the other end 26 of which extends into an opening of a plunger 27 fast with the locking bolt 22 (Figure 8). The plunger and locking bolt are pressed in the engaging direction by means of a spring 28.

With reference now to Figures 1, 2 and 4, at the loading "station" L there is a hopper 29 containing a stack of rings which are to be treated and down which the rings are fed by gravity on to a slide 30. The rings in this case are assumed to be split ones. The slide is adapted to receive one ring, as shown at 31, at a time. (The reference 31 is hereinafter applied to any ring being treated.) The hopper, comprising an adjustable flat portion 29a and an adjustable V-shaped portion 29b spaced therefrom, is fast with a vertical blade 32 which enters into the gaps of the rings in the stack so as to deliver the bottom ring to the slide in a predetermined angular position.

The slide is connected by a rod 33 (Figure 4) to a plunger 34 operable within a pneumatic cylinder 35, and at the appropriate time air pressure is supplied to the left-hand end (Figure 4) of the cylinder 35 to force the plunger and the slide to the right to carry the ring 31 beneath a plunger 37 when raised. The latter is fast with a piston 38 which is pneumatically reciprocable at the appropriate times within a cylinder 39.

The cylinder 35 and slide 30 are positionable for height, dependently upon the axial thickness of a ring 31, by means of a slide 40 fast with the cylinder and engaged by an adjustable eccentric 41.

When the plunger 37 is lowered the stack 42 of rings beneath it is forced downwardly through a tapering bore 43 which progressively closes their gaps, and the lowest ring is forced into the adjacent receiver 44, which is carried by the rotor 13.

The parts at the loading "station" are more fully described in the co-pending specification aforesaid.

Each of the ten receivers comprises, as shown most clearly by Figures 4 and 5, a tubular element 46 which is rotatable in the rotor 13 about a vertical axis and is fast with a wheel 47 (Figures 1 and 4) having one tooth 48 for each cutting "station." While at the loading "station" an abutment 49 (Figure 4) coacts with one of the teeth 48.

Internally of the tubular element 46 is a spindle 50 carrying at its upper end a plunger 51 upon which the ring 31 can rest within the cylindrical portion 52 at the upper end of and fast with the tubular element 46. The lower end of the plunger stem 50 is pressed by the spring 53 to coact with a cam 54 which is concentric with the axis of the machine. While the receiver at the loading "station" is being charged with a ring 31 the plunger 51 is fully lowered. When the rotor 13 is notched on one step to carry a newly-charged receiver 44 to the first cutting "station" C1, the lower end of the plunger stem 50 rides up the incline 55 (Figure 4) of the cam 54 and raises the ring 31 to be almost clear of the upper edge of the cylindrical portion 52.

At each cutting "station" fluid pressure supplied to a pneumatic device 55a (Figure 1) forces upwardly a rod 56 (Figure 5) and rocks a lever 57 in an anti-clockwise direction (Figure 5) against a spring 58 to lower a clamping plate 59 on to the upper face of the ring 31 and thereby hold it in a position, almost clear of the cylindrical portion 52, in which it can have a slot cut.

Figure 5 shows a rotatable saw 60 in the act of slotting a ring 31. The saw is on a spindle 61 journalled in bearings 62 in a slide 64 which is movable in guides 65 (Figures 1 and 5) of the stationary portion of the machine in a radial direction. Peripheral recesses 66 (eight altogether, one for each "station," in the present instance) are provided in the cylindrical portion 52 to accommodate the adjacent end of the spindle 61 when the saw 60 is advanced fully into a ring 31. The upper end of the spindle 61 carries a bevel gear 67 in mesh with a bevel gear 68 which is journalled in the slide 64 and has a sliding and driving connection, indicated at 69, with a spindle 70 journalled in the stationary portion of the machine. The spindle 70 carries a bevel pinion 71 in mesh with the driving bevel gear 72 on a central shaft 73 of the machine.

For reciprocating each slide 64 to carry the associated rotating saw 60 from an inoperative position into engagement with a ring 31, the slide is connected with a rod 75 (Figure 5) carrying a pin 76 the lower end of which coacts (see Figure 7) with a cam ring 77, (Figure 4) fast with the spindle 20, and also with spaced cam abutments 78 which are likewise fast with the rotatable spindle 20. Figure 7 shows the pin 76 held in the position in which the saw is inoperative. Rotating the cam 77 and the abutments 78 in an anticlockwise direction (Figure 7) moves the associated abutment 78 clear of the pin 76, and the outwardly-extending surface 79 of the cam forces the pin through the gap 80 between the two adjacent abutments 78 in which conditions the saw operatively engages the work.

Having completed a cutting operation the continued rotation of the spindle 20 brings the next abutment 78 into contact with the pin 76 to withdraw it to the inoperative position shown in Figure 7.

Thereupon the fluid pressure by which the rod 56 was raised to operate the clamp plate 59 of the associated cutting "station" is released, the clamp plate is raised, and the receiver 44 is stepped on to the next cutting "station" by the notching on of the rotor 13 as described above.

Figure 3 indicates the manner in which the carriers 44 are indexed. It will be observed that at the loading "station" L one of the teeth 48 is engaged with the abutment 49 as aforesaid. When the rotor 13 is stepped on to carry the carrier to the first cutting "station" C1, one of the teeth 48, namely, that marked 48a, has one edge removed as shown in order to clear a fixed abutment 82 at the cutting "station" C1 and the next tooth (in an anti-clockwise direction) engages this abutment, just as the rotor movement ceases, in order that the receiver 44 shall be correctly positioned angularly for the first slot to be cut. The direction of rotation of the saw is such as to tend to drive the carrier clockwise, the engagement of a tooth 48 with the abutment 82 preventing this.

In a similar manner, when the rotor 13 moves the carrier to the next cutting "station" C2, the uncut edge of the tooth 48a engages the abutment 82 at this "station" and turns the carrier, as the rotor is coming to rest, in an anti-clockwise direction about its axis through an angle of 45° (as there are eight slots to be cut), thereby positioning the ring 31 angularly for the second slot to be cut, and so on.

On leaving the eighth cutting "station" C8 the carrier is again partially rotated anti-clockwise, though to a less extent than 45°, on reaching the discharge "station" D by engagement of one of the teeth 48 with a slightly different abutment 83 at the discharge "station," the cut-away tooth 48a just clearing this abutment. On leaving the discharge "station" the carrier is partially rotated, by the abutment 83, in an anti-clockwise direction, but on reaching the loading "station" it is partially rotated in the other direction, i. e., clockwise about its axis, by the engagement of one of its teeth 48 with the abutment 49, and is thus angularly positioned as necessary to receive the new ring 31. It will be observed from a consideration of the key 84 that when moving from the cutting "station" C8 to the cutting "station" C1, the total rotation in an anti-clockwise direction of the carrier equals substantially 45°.

At each "station" a spring-pressed ball 85 (see Figure 4) in the rotor 13 engages a locating slot in the wheel 47 for providing light angular location.

With reference now to Figure 6, which shows a carrier 44 at the discharge "station" D, as the carrier approaches that "station" its upper end travels along the lower edge of a flat portion of a spring 86 until reaching the bent end 87 thereof, whereupon, during further movement of the carrier to the discharge position shown, the ring 31, extending partly out of the carrier, flexes the spring fully out of its way. Furthermore, the surface of the cam ring 55 (Figure 1) is raised slightly above the general level in the vicinity of the discharge "station," and the plunger stem 50, riding up this further inclination, finally fully ejects the completed ring 31 from the upper end of the cylindrical portion 52, whereupon the ring, being no longer located, is shot by the spring 86 as the latter unflexes on to a chute 88 by which it can be delivered to any convenient place.

In the present instance we dispose a main pressure control 90 (Figures 1 and 6) at the discharge "station" D, from which pressure pipes 91 are led to all the various pneumatic devices, so that these will operate at the requisite moments.

It is not believed to be necessary for details of the control to be illustrated and described.

What I claim as my invention and desire to secure by Letters Patent of the United States is:

A continuously-operable machine, for cutting angularly-spaced, part-circumferential slots in a ring, comprising a rotor revolvable about a vertical axis and carrying a number of vertical, rotatable receivers, means for driving said rotor with a step-by-step motion whereby each receiver will successively pause at a receiving "station," then at successive cutting "stations," and then at a discharging "station," each of said receivers having a hollow cylindrical portion at its upper end, means for forcing a ring into said cylindrical portion of a receiver when the latter is at the receiving "station," each of said receivers also having a plunger in said cylindrical portion beneath said ring, cam means for operating said plungers in succession, as the associated receivers leave the receiving "station," to support said rings partially-ejected from said cylindrical portions, said cam means also operating said plungers in succession, as the associated receivers reach the discharging "station," to fully eject said rings from said cylindrical portions, a spring which is engaged and stressed by the ring in the receiver as the latter approaches the said discharging "station," the spring flicking the ring to a discharge point when the ring is ejected from said receiver by its associated plunger, means for lowering and pressing a clamping plate on to said partially-ejected ring at each cutting "station" and for raising it on the completion of the cutting operation, a radially-acting slide at each cutting "station," a circular cutter rotatably carried by each slide, means for rotating said cutters, means for simultaneously reciprocating said slides for effecting slotting operations on said rings while held by said clamping plates, and means for indexing each receiver angularly for each cutting "station."

ARTHUR J. WOOLCOTT.

REFERENCES CITED

The following references are of record in the file of this patent:

UNITED STATES PATENTS

| Number | Name | Date |
|---|---|---|
| 323,175 | Marsh | July 28, 1885 |
| 576,979 | Gregory | Feb. 9, 1897 |
| 1,627,934 | Stein | May 10, 1927 |
| 1,667,601 | Maurer | Apr. 24, 1928 |
| 1,789,014 | Millar | Jan. 13, 1931 |
| 1,870,996 | Hoern | Aug. 9, 1932 |
| 1,968,840 | Linn | Aug. 7, 1934 |
| 2,041,309 | Verderber et al. | May 19, 1936 |
| 2,418,070 | Green | Mar. 25, 1947 |